Figure 1:
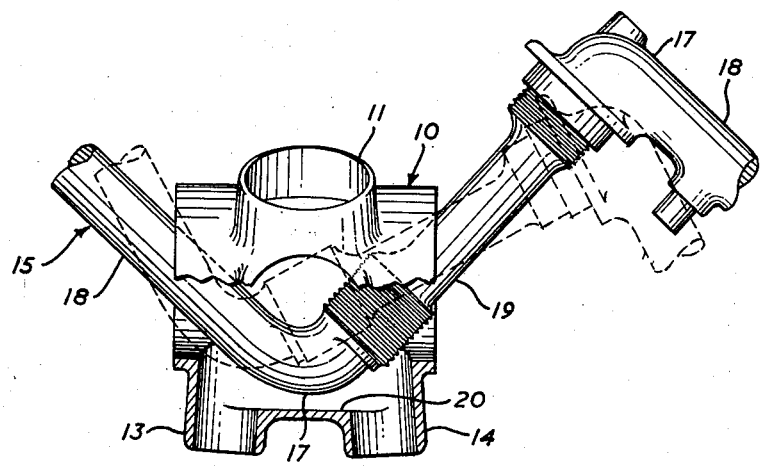
Figure 2:
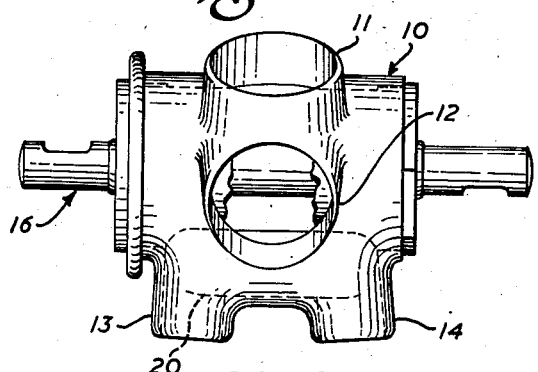
Figures 3, 4, 5:
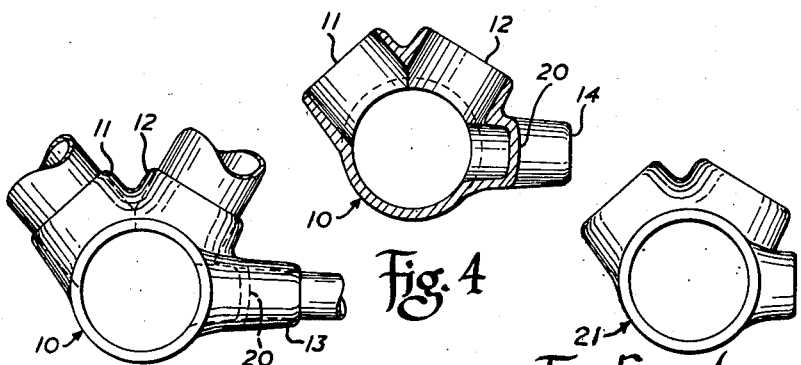

Feb. 23, 1954 L. SHAKESBY ET AL 2,670,219
CRANKCASE OF BICYCLE FRAME
Filed June 26, 1951

Inventors
LEONARD SHAKESBY
FREDERICK L. SAINSBURY
by: Fetherstonhaugh & Co.
Attys.

UNITED STATES PATENT OFFICE 2,670,219

CRANKCASE OF BICYCLE FRAME

Leonard Shakesby and Frederick L. Sainsbury, Weston, Ontario, Canada, assignors to Canada Cycle and Motor Company Limited, Weston, Ontario, Canada Application June 26, 1951, Serial No. 233,530

2 Claims. (Cl. 280—281)

This invention relates generally to bicycles and more specifically to the formation of the crank case of a bicycle.

In the conventional bicycle a pedal crank having two crank arms joined by a connecting shaft is journalled within a crank case on a bicycle frame. In the past, two types of cranks have been popular, one, the one piece crank, and, two, the three piece crank. The one piece crank comprises two crank arms with their longitudinal axes in parallel spaced relation and united at their inner ends by a connecting shaft portion. In the three piece crank, the crank arms are formed separately to the connecting portion and are joined to it by means of pins.

Each type of crank has its advantages and disadvantages. The one piece crank, is, of course, the cheaper to make and generally speaking stronger because no pinned joints are involved, but the crank case in which it is journalled must be made relatively large to accommodate the sweep of the elbow formed where the crank arm unites with the connecting shaft portion as it is projected into the tubular crank case.

With the three piece crank, the crank case can be made with a relatively small diameter because it is only necessary to project a straight connecting portion through it when assembling the bicycle. The crank arms are pinned to the connecting portion after it has been journalled in the crank case.

We have devised a crank case, the general diameter of which is substantially the same as the diameter of the crank case that accommodates a three piece crank, but which is capable of mounting a conventional one piece crank as well as a three piece crank. With our construction the required diameter of the crank case for both the one piece and the three piece crank is substantially the same size and bicycle manufacture and service is considerably more standardized. It is also cheaper to form a crank case with a smaller diameter.

It is, then, a prime object of our invention to form a bicycle crank case of relatively small diameter in which can be mounted both a one piece and a three piece crank.

Other objects of our invention will be apparent from reading the disclosure.

Generally speaking, our improved crank case has a cross-section too small to accommodate the sweep of the elbow formed where crank arms and the connecting shafts of a one piece crank unite as the crank is projected through the tubular crank case, but it has an external blister that is capable of accommodating the sweep of the elbow where the crank portion unites with the connecting shaft as the crank is projected through the crank casing. The invention will be clearly understood after reference to the following detailed specifications read in conjunction with the drawings.

In the drawings:

Figure I is a fragmentary view partially broken away showing a one piece crank being inserted into the crank case according to the invention.

Figure II is a view showing the connecting portion of a three piece crank mounted in a crank casing according to our invention.

Figure III is a side view of the crank illustrated in Figures I and II, the dotted lines showing the position of the blister.

Figure IV is a cross sectional view of the crank case illustrated in Figures I, II and III.

Figure V is a side view of a conventional crank case for a three piece crank.

Referring to the drawings the tubular bicycle crank case 10 illustrated in Figures I to IV is constructed according to the invention. Its general geometry is similar to the geometry of prior crank cases; by that we mean it has the usual sockets 11, 12, 13 and 14 extending radially therefrom for connection with the usual bicycle frame members. This general geometry, and the manner in which the crank case is united to the tubular bicycle frame members, is so well-known that it need not further be expanded upon in this specification since the specification is concerned with the formation of the crank case per se and to include well-known bicycle construction would unnecessarily burden it.

Our crank case is designed to accommodate both a one piece bicycle crank illustrated fragmentarily in Figure I and generally referred to by numeral 15, the cross member 16 of the conventional three piece bicycle crank as indicated in Figure II, but the general diameter of the tubular crank case 10 is the size usually provided for the cross member 16 of the three piece crank.

As we have indicated above, the diameter of a tubular bicycle crank case for a one piece crank is customarily substantially greater than the diameter of a tubular crank case for a three piece crank because the one piece crank case must have a sufficient diameter to accommodate the sweep of the elbow 17 formed at the union of the crank arms 18 and the connecting shaft 19 of the one piece crank 15 when the crank is projected through the tubular crank case 10. The same difficulty does not arise with the conventional three piece crank because the crank arms are removed from the connecting portion 16 before it is mounted in the crank case.

According to my invention we form the tubular crank case 10 of a bicycle frame with a cross-section too small to accommodate the sweep of the elbow 17 of the one piece crank as it is projected through the tubular casing but also form it with a blister 20 that communicates with the interior of the crank case 10 to accommodate the sweep of the elbow 17 as the crank 15 is projected through the crank casing for mounting.

By thus providing a blistered portion to accommodate the elbow of the one piece, we are able to make a one piece crank case 10 capable of mounting a one piece crank that has the same general diameter as the diameter of the conventional crank case for mounting the three piece crank. In Figure I, we have illustrated the manner in which the one piece crank 15 is inserted for mounting in the crank case 10.

The practical advantages that flow from this are substantial because it is possible to mount in the one crank case either a one piece crank or a three piece crank. It will be apparent that such a possibility will greatly simplify the manufacture and servicing of bicycles.

The blister 20 could be formed in a number of places, but we prefer to form it between the two connecting portions 13 and 14, which, by those skilled in the art, will be recognized as the connecting portions that unite with the lower rear forks in the bicycle frame.

In Figure V we have shown a side view of a conventional crank case 21 for a three piece crank to illustrate the similarity in diameter of our improved crank case with it. Figures III and IV are side views of our improved crank case drawn to the same scale as the view of Figure V. The only noticeable difference is, perhaps, the slight elongation of the connecting members 13 and 14.

As we indicated above, our drawings have omitted all unnecessary detail. As well as omitting to show a complete bicycle frame, we have omitted to show the complete crank 15, the crank arms and their manner of connection for shaft 16 of the three piece crank, and the specific journalling means for the cranks in the crank cases.

All of these things are conventional, though, and very well known in the art and accordingly their omission is thought proper.

What we claim as our invention is:

1. In a bicycle, a tubular crank case, a one-piece crank having two crank arms with their longitudinal axes in parallel spaced relation and united at their inner ends by a connecting shaft portion, said arms extending in opposite directions from their points of union with said connecting shaft portion, said points of union hereinafter being called elbows, an external blister formed in the wall of said crank case at one portion thereof, the wall of said crank case being too confining to permit the elbow of said crank to pass therethrough save only at said portion where said blister is formed therein, said blister being elongated, the longitudinal axis of said blister being substantially parallel with the longitudinal axis of said tubular crank case, and having dimensions to accommodate one of said elbows of said crank as it passes through said crank case, said blister having a width not substantially greater than the thickness of the crank.

2. In a bicycle, a tubular crank case as claimed in claim 1, having sockets extending therefrom, to which are connected bicycle frame members, two of said sockets being spaced apart for connection with rear fork members, said two latter sockets extending from said blister and being aligned longitudinally of said crank case.

LEONARD SHAKESBY.
F. L. SAINSBURY.

References Cited in the file of this patent

UNITED STATES PATENTS

| Number | Name | Date |
|---|---|---|
| 588,804 | Parish | Aug. 24, 1897 |
| 672,135 | Richards | Apr. 16, 1901 |
| 2,353,712 | Dewey | July 18, 1944 |

FOREIGN PATENTS

| Number | Country | Date |
|---|---|---|
| 14,617 | Great Britain | of 1893 |
| 461,725 | Italy | Feb. 9, 1951 |
| 579,409 | Great Britain | Aug. 1, 1946 |